June 8, 1965 H. A. KREILICK 3,187,688

PALLET

Filed Dec. 30, 1963 2 Sheets-Sheet 1

INVENTOR:
HERBERT A. KREILICK
BY
ATT'YS

June 8, 1965   H. A. KREILICK   3,187,688
PALLET
Filed Dec. 30, 1963   2 Sheets-Sheet 2
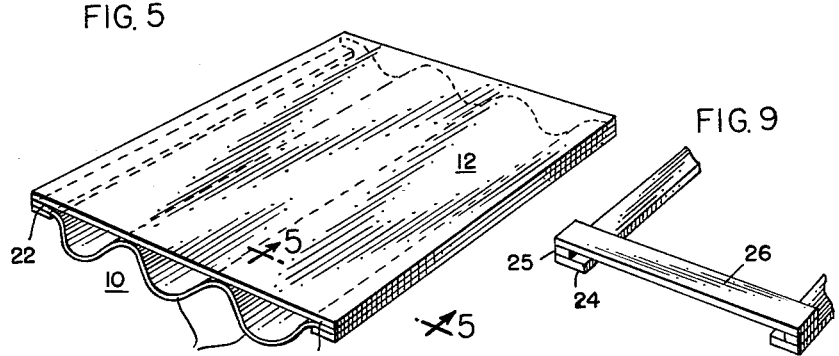
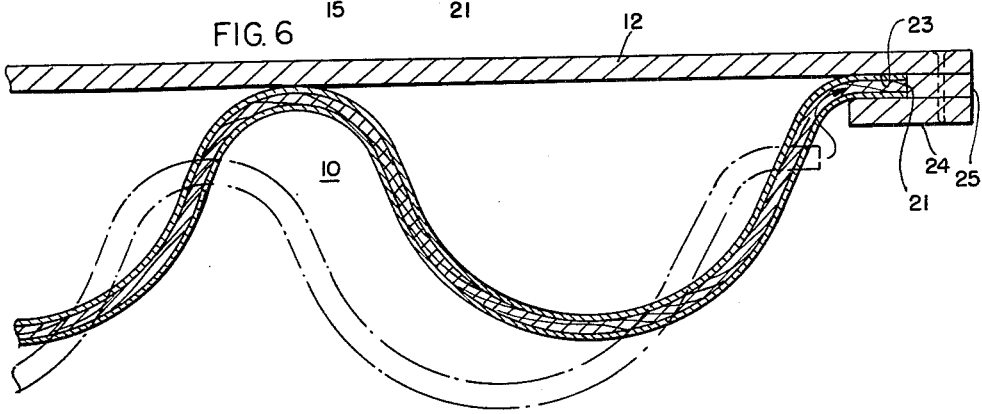
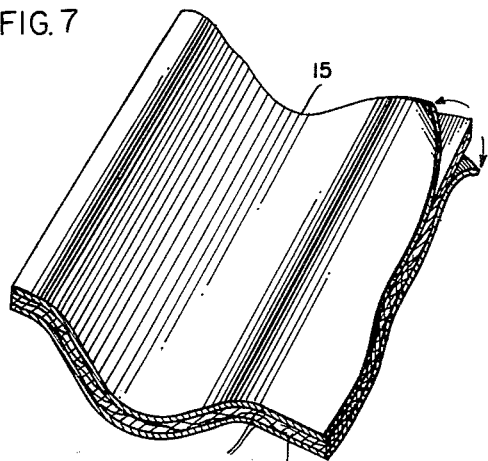
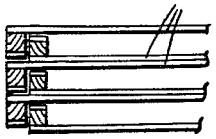
INVENTOR:
HERBERT A. KREILICK
BY
ATT'YS

United States Patent Office 3,187,688
Patented June 8, 1965

3,187,688
PALLET
Herbert A. Kreilick, Webster Groves, Mo., assignor to Woodkor Corporation, a corporation of Illinois
Filed Dec. 30, 1963, Ser. No. 334,478
6 Claims. (Cl. 108—55)

This invention relates to pallets used for the support of articles for storage and/or transport.

The main objects of this invention are; to provide an improved form of pallet for use in industry for stacking thereon articles for storage and/or transport; to provide an improved pallet of this kind comprised of separately-structured corrugated base element and form-retaining means adapted to be assembled in superimposed relationship to retain the base element in normal planar disposition when in use; to provide a corrugated pallet base element preferably structured from tough paper sheets laminated over a wood veneer core and varied forms of retaining means for adapting the pallets to different uses; to provide the form-retaining means either as a panel structured of the same material as the base element or as opposedly-open hooks fixed at the ends of flexible metal strips for transversely spanning the corrugated base element and seating over the lateral perimeters thereof; and to provide a pallet of this kind of such simple structure as to make very economical the manufacture and marketing thereof and extremely facile the use thereof for practically every possible purpose known to modern industry.

In the accompanying drawings;

FIG. 5 is a perspective view of a pallet with the same type of base element but with a modified type of form-retaining means;

FIG. 6 is a much-enlarged, fragmentary, cross-sectional view, taken on the plane of the line 6—6 of FIG. 5 and illustrating how the form-retaining member is positioned on or removed from the corrugated base element;

FIG. 7 is an enlarged, fragmentary detail illustrating the preferred laminated structure of the base element used in either of the illustrated pallet adaptations and for the form-retaining means of FIGS. 5 and 6, if desired;

FIG. 8 is a diagrammatic view showing how the form-retaining means of FIG. 5 also may be stacked compactly, in space-saving relationship, pending their need for forming pallets; and FIG. 9 is a modified form of form-retaining member.

The essential concept of this invention involves a corrugated base element and separately-structured form-retaining means positionable on the base element to maintain it in a normal planar disposition for use in stacking thereon articles for storage and/or for transport.

Figure 1:
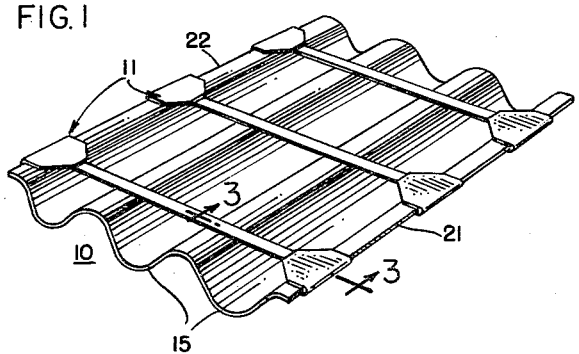
FIGURE 1 is a perspective view of a pallet constructed in accordance with this invention with one type of removable form-retaining means.
Figure 2:
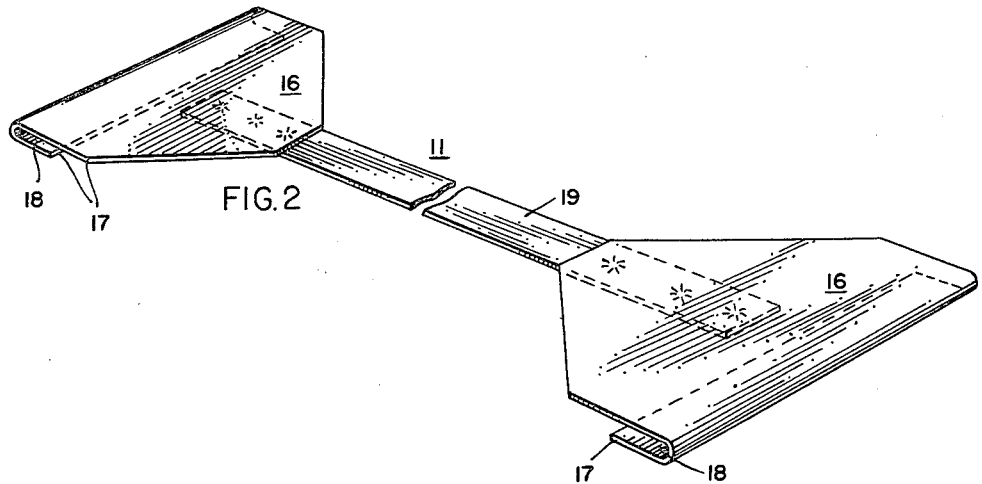
FIG. 2 is an enlarged perspective view of the type of form-retaining means used in FIG. 1.
Figure 3:
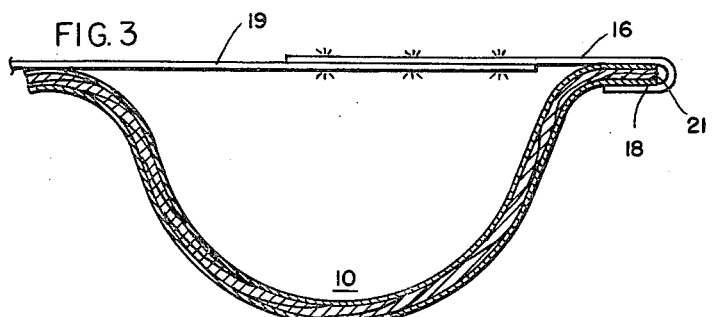
FIG. 3 is a much-enlarged, fragmentary, sectional detail taken on the plane of the line 3—3 of FIG. 1.

A pallet embodying the foregoing concept comprises a base-element 10 and form-retaining means either of the multiple type 11, shown in FIGS. 1–3 or the single type 12, shown in FIGS. 5 and 6.

The base element 10 is a section of corrugated material of a structure such as set forth in my co-pending application Ser. No. 85,430 filed January 27, 1961, now U.S. Patent 3,135,228. As best shown in FIG. 7, this is composed of a wood-veneer core 13 between laminated sheets 14. The wood veneer core is such as is used for the core of plywood. The sheets 14 preferably are either tough-textured paper or a very thin wood veneer. A most suitable type of paper is "kraft" paper. Such laminated material is available on the market under the name of "Craveneer." A thin laminated wood-veneer core also is commercially available as plywood wherein the thin exterior veneer is generally a firmer texture than the core itself. The corrugations 15, in number and spacing, are arranged so as to permit facile insertion of the forks of a conventional lift truck. Clearly, this spacing may be accommodated to any type of lift truck in use in a particular plant or industry. The over-all dimensions of such a base element 10 may be made to meet the standard for any particular use as required in various industries.

The form-retaining means 11, as shown in FIGS. 1–3, comprises a pair of polygonal-shaped plates 16 a perimetrical base portion 17 of each of which is doubled back to form a type of hook 18. A pair of such-formed plates 16 are bonded at the opposite ends of a strip of fairly-flexible strap metal 19. The distance between the bases of these opposedly-open hooks 18 is approximately the same as the distance across the base-element 10, transversely of the corrugations 15 and between the lateral perimeters 21 and 22 of the base-element 10. One or more such form-retaining means 11 are positionable on the base element 10 by flexing the latter into a somewhat bowed contour (as suggested in FIG. 6). Thereupon, it becomes possible to position one or more of the form-retaining means 11 with the hook-ends 18 of the plates 16 seated over the perimeters 21 and 22 of the base-element 10. Upon releasing the flexed base element 10, these form-retaining means 11 become tensioned across the base-element 10 and retain it in its normal planar disposition ready for use.

The form-retaining means 12, as shown in FIGS. 5 and 6, is a thin, rectangular flat panel. As shown in FIG. 5, in one dimension this panel is the same as that of the base-element 10 in the direction of the corrugations 15. In the other direction the panel dimension is enough greater than the comparable dimension of the base-element 10 to permit forming opposedly-open hook slots 23 along the under lateral perimeters of the panel to set over the lateral perimeters 21 and 22 of the base-element 10. Such hook slots 23 are shown here as formed by superimposed different-width strips 24 and 25 secured along the lateral perimeters of the panel.

Here, as with the form-retaining means 11, the distance between the bases of these opposedly-open hook-slots 23 is approximately the same as the distance across the base element 10 transversely of the corrugations 15. Such a form-retaining panel means 12 is positionable on the base-element 10 simply by flexing the latter into a somewhat bowed contour, as indicated in FIG. 6, after one of the perimeters of the base element 10 has been seated in one of the hook slots 23.

In FIG. 9 I have disclosed another form of form-retaining means wherein a series of rectangular pieces of wood 26 are anchored to transverse strips 24–25 which latter strips are identical to those of FIGS. 5 and 6.

Figure 4:
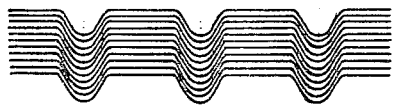
FIG. 4 is a diagrammatic view showing how the base elements may be stacked compactly, in space-saving relationship, pending their use no form pallets.

These readily separable and easily assembled base elements 10 and form-retaining means 11 and 12 provide the great advantage of compact stacking pending their assembly for use as pallets. Such stacking of these parts is diagrammatically illustrated in the respective FIGS. 4 and 8. Obviously, there is a great saving in storage space over the conventional permanently-structured pallets. Moreover, there is the further advantage in that it is possible to replace one of the parts when it becomes damaged without discarding the entire pallet.

Although but three specific embodiments of this invention have been herein shown and described, it will be understood that details of the structures shown may be altered or omitted without departing from the spirit of the invention as defined by the following claims.

I claim:
1. A pallet comprising a corrugated base element and separately-structured, form-retaining means spanning the base element transversely of the corrugations and embracing the opposite lateral perimeters of the base element to retain the same in normal planar disposition.
2. A pallet comprising a corrugated base element structured for normal stable planar disposition, and form-retaining means spanning the straight opposite lateral perimeters of the base element, transversely of the corrugations when the base element is in normal planar disposition, and having opposedly-open hook means embracing the lateral perimeters of the base member whereby the base element is maintained in normal planar disposition.
3. A pallet as set forth in claim 2 wherein the base element is structured from flexible material to permit the bowing thereof out of its normal planar disposition for positioning the form-retaining means on or removal from the base element.
4. A pallet as set forth in claim 3 wherein the form-retaining means is a thin, flat panel of a dimension approximating that of the base element in its normal planar disposition.
5. A pallet as set forth in claim 2 wherein the base element is structured from a veneer core overlaid with thin, tough sheet-material and the form-retaining means is a thin, flat panel of the same material as the base element.
6. A pallet comprising, a corrugated base element structured for normal stable planar disposition, and form-retaining means consisting of a pair of hook plates secured to the ends of a narrow flexible strip in opposedly-open relationship with the bottoms of the hook plates spaced apart a distance substantially equal to the width of the base element transversely of the corrugations when the base element is in its normal planar disposition.

References Cited by the Examiner
UNITED STATES PATENTS

| | | | |
|---|---|---|---|
| 1,359,835 | 11/20 | Pease | 108—51 |
| 2,615,661 | 10/52 | Cushman | 108–52 |
| 2,918,242 | 12/59 | Olivette et al. | 108—51 |
| 3,120,825 | 2/64 | Johnson | 108—51 |
| 3,131,656 | 5/64 | Houle | 108—56 |
| 3,135,228 | 6/64 | Fleming et al. | 108—55 |

FRANK B. SHERRY, *Primary Examiner.*